H. J. NORTON & J. EDGAR.
Feeder for Thrashing-Machine.
No. 218,683. Patented Aug. 19, 1879.
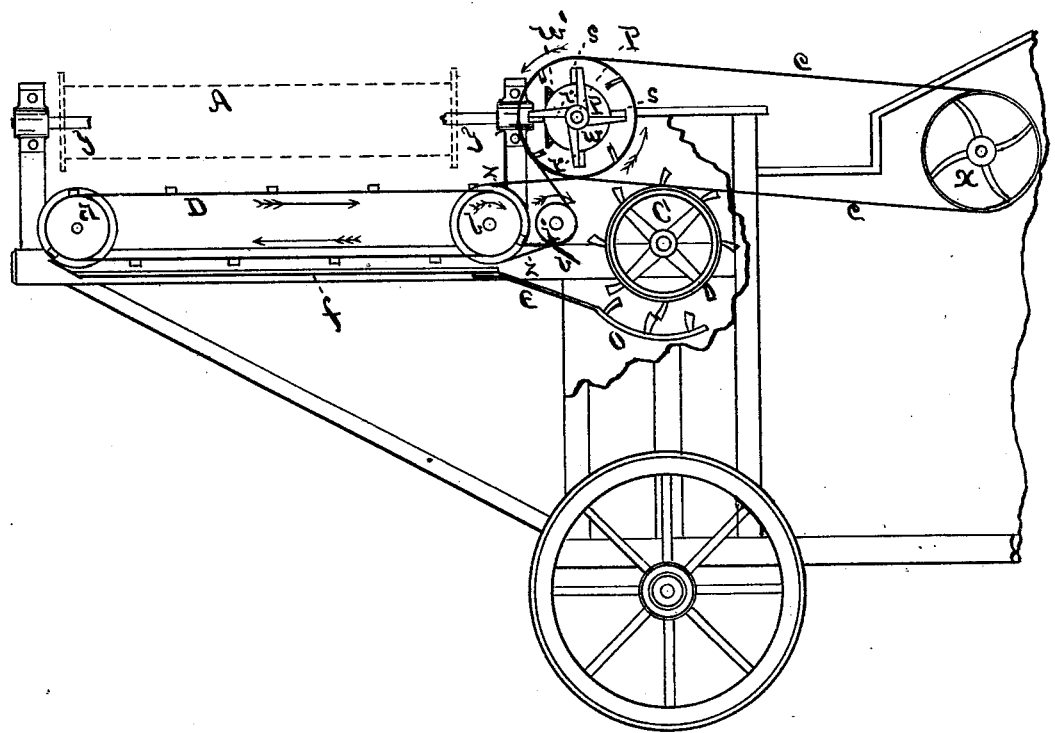

UNITED STATES PATENT OFFICE.

HATLEY J. NORTON AND JOHN EDGAR, OF SACRAMENTO, CALIFORNIA.

IMPROVEMENT IN FEEDERS FOR THRASHING-MACHINES.

Specification forming part of Letters Patent No. 218,683, dated August 19, 1879; application filed April 17, 1879.

*To all whom it may concern:*

Be it known that we, HATLEY J. NORTON and JOHN EDGAR, of the city of Sacramento, State of California, have invented a new and useful Improvement in Feeders for Thrashing-Machines or Separators, of which the following is a specification.

The object of the improvement is to form a device by which a constant and even supply of straw can be fed into the thrasher; and consists of a conveying apron or draper, a rotating picker, and a roller, in combination with the cylinder of a thrashing-machine.

In the accompanying drawing is shown a side elevation of the cylinder end of a thrashing-machine with a feeder attached embodying our invention.

A shows the elevators in dotted lines, which are used to carry the straw to the machine. D is the draper, upon which the straw falls. The draper is an endless belt running around the rollers $a$ $b$, and has a motion in the direction shown by the arrows.

P is a rotating picker, formed by two sets of arms, $r$, and longitudinal slots $s$. The rotation of P is shown by arrows, and is driven by belt $c$ running from a convenient pulley, $x$, on the machine. The belt $c$ rotates the shaft of picker P, upon which is placed a bevel-wheel, $w$, that meshes in the wheel $w'$ attached to the shaft $y$, which runs the elevator A.

On the end of the picker-shaft P, opposite to the belt $c$, is placed a second belt, $z$, which works on and rotates the roller $i$, and draper-roller $b$, causing them to rotate, as shown by arrows.

Under the roller $i$ is placed a small shield, $v$, which stops the grain and straw that is whipped by the cylinder C. Under the draper D is placed a floor, $f$, which, with the incline $e$, extends to the concave $o$.

Now, as the grain falls from A into the draper D it is carried toward the cylinder C, and passes under the picker P and over the roller $i$. By the rotation of the picker P and roller $i$ the grain is pressed between them and carried directly from the draper D into the cylinder C.

The advantage of the above-described form of picker P is that it acts evenly on the grain across the whole width of the machine, and takes a firm hold of the grain that enters between it and the roller $i$, while at the same time it will only allow a certain quantity of grain to enter at one time, which causes a steady and even amount of grain to be fed into the cylinder.

What we claim as our invention is—

The roller $i$, situated beneath the picker P at the inner end of the draper D, and between said draper and the cylinder C, for the purpose of aiding in the delivery of the grain to the cylinder, and of protecting the draper from the straw during the action of said cylinder, substantially as and for the purposes set forth.

HATLEY J. NORTON.
JOHN EDGAR.

Witnesses:
BARTON B. WARD,
ELISON V. BUCKLEY.